Figure 1:
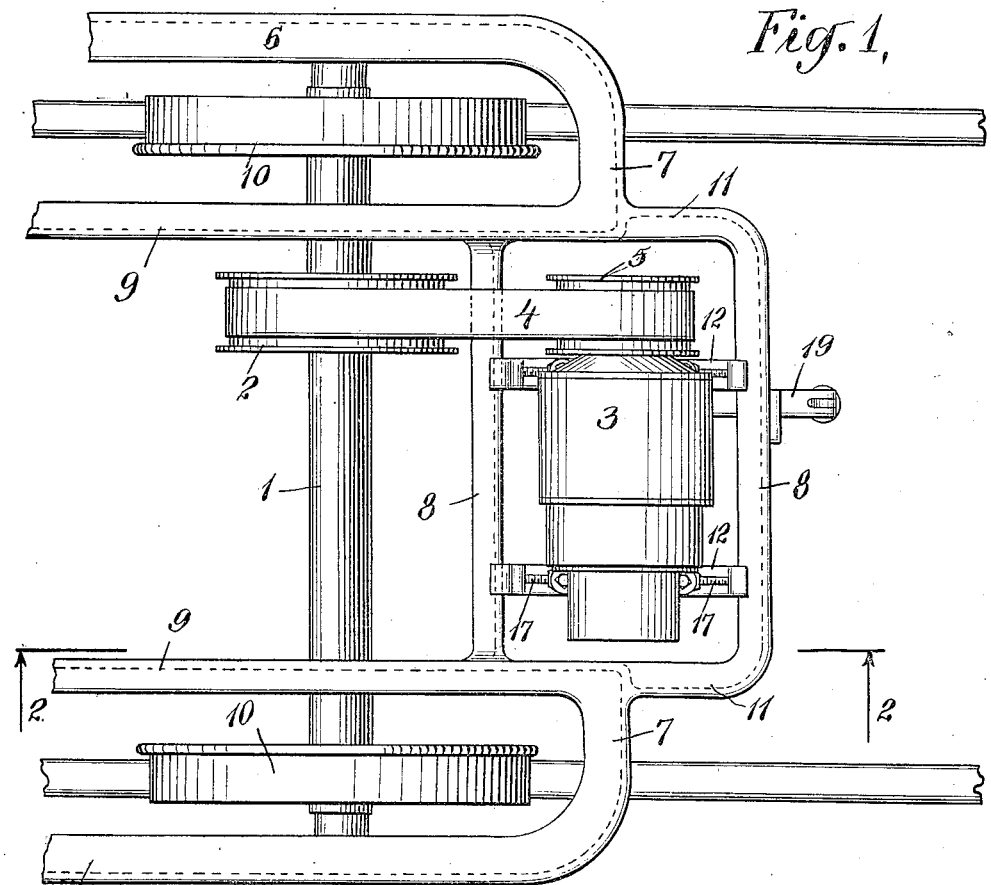

P. KENNEDY.
TRUCK CONSTRUCTION FOR DYNAMO SUSPENSION.
APPLICATION FILED MAY 17, 1911.

1,049,103.

Patented Dec. 31, 1912.

2 SHEETS—SHEET 1.

WITNESSES:
Minerva Lobel
Agnes Bill

INVENTOR
Patrick Kennedy
BY
Pennie, Davis & Goldsborough
ATTORNEYS

P. KENNEDY.
TRUCK CONSTRUCTION FOR DYNAMO SUSPENSION.
APPLICATION FILED MAY 17, 1911.

1,049,103.

Patented Dec. 31, 1912.

2 SHEETS—SHEET 2.

WITNESSES:
Minerva Lobel
Agnes Bill

INVENTOR
Patrick Kennedy
BY
Pennie, Davis & Goldsborough
ATTORNEYS

UNITED STATES PATENT OFFICE.

PATRICK KENNEDY, OF NEW YORK, N. Y., ASSIGNOR TO CONSOLIDATED RAILWAY ELECTRIC LIGHTING AND EQUIPMENT COMPANY, OF NEW YORK, N. Y., A CORPORATION OF MAINE.

TRUCK CONSTRUCTION FOR DYNAMO SUSPENSION.

1,049,103.  Specification of Letters Patent.  Patented Dec. 31, 1912.

Application filed May 17, 1911. Serial No. 627,772.

*To all whom it may concern:*

Be it known that I, PATRICK KENNEDY, a citizen of the United States, residing at No. 177 Putnam avenue, borough of Brooklyn, county of Kings, city and State of New York, have invented certain new and useful Improvements in Truck Construction for Dynamo Suspension; and I do hereby declare the following to be a full, clear, and exact description of the invention, such as will enable others skilled in the art to which it appertains to make and use the same.

This invention relates to truck constructions for dynamo suspension, and particularly to a form adapted to suspend within the truck frame an axle driven car lighting generator or an electric motor adapted to drive the axle.

Heretofore it has been customary to provide an overhanging frame or outrigger on the truck to suspend the generator outside of the end-sill, or else to hang the dynamo between the axles of the truck. In the outside hung arrangement the forgings required are somewhat complicated and furthermore the truck may be seriously overbalanced and made unstable, even when the outrigging is braced on the sides, by reason of the distance between the dynamo and the axle; in consequence of which the smooth operation of the truck, particularly at high speeds, is interfered with. To overcome this difficulty, counterbalancing weights have sometimes been used, but these devices introduce additional weight and complication. With an inside hung dynamo, the available space between the axles is so limited by truck members and the brake rigging that either the brake rigging must be overcrowded, or the dynamo must be placed so close to the truck axle that the driving belt does not operate satisfactory under ordinary conditions. It is not feasible to suspend a dynamo of ordinary size beneath the end-sill, owing to the clearance required above the top of the track rails.

In accordance with my invention, these difficulties are obviated by dividing the end-sill so as to form a closed frame surrounding a space in which the dynamo is hung, whereby the center line of the dynamo may be substantially in line with the end-sills of previous forms of construction. In this way the overbalancing effects are greatly reduced, while the distance from the axle is still sufficient to insure against slipping of the driving belt. Furthermore, overcrowding of the dynamo or the brake rigging is eliminated and ample space for belt tightening and tensioning devices is available.

It will be obvious that various modifications of the construction herein shown may be made without departing from the spirit of my invention, and, therefore, I do not in any way limit myself to the specific form shown in the accompanying drawings which serve to illustrate only the preferred embodiment, wherein—

Figure 2:
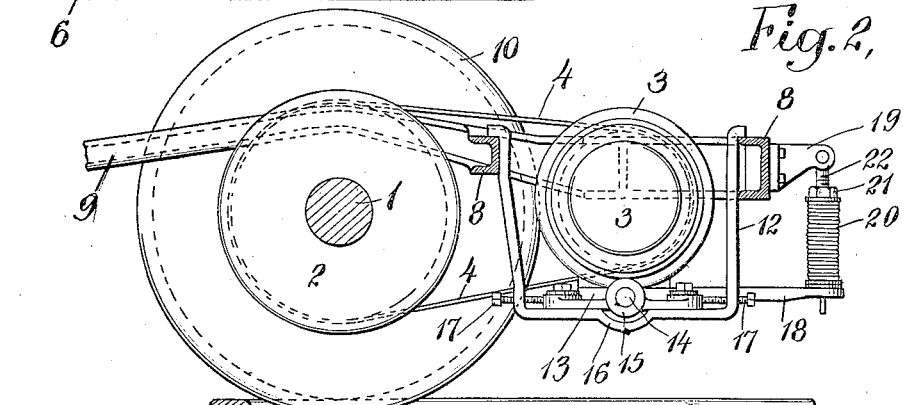
Figure 3:
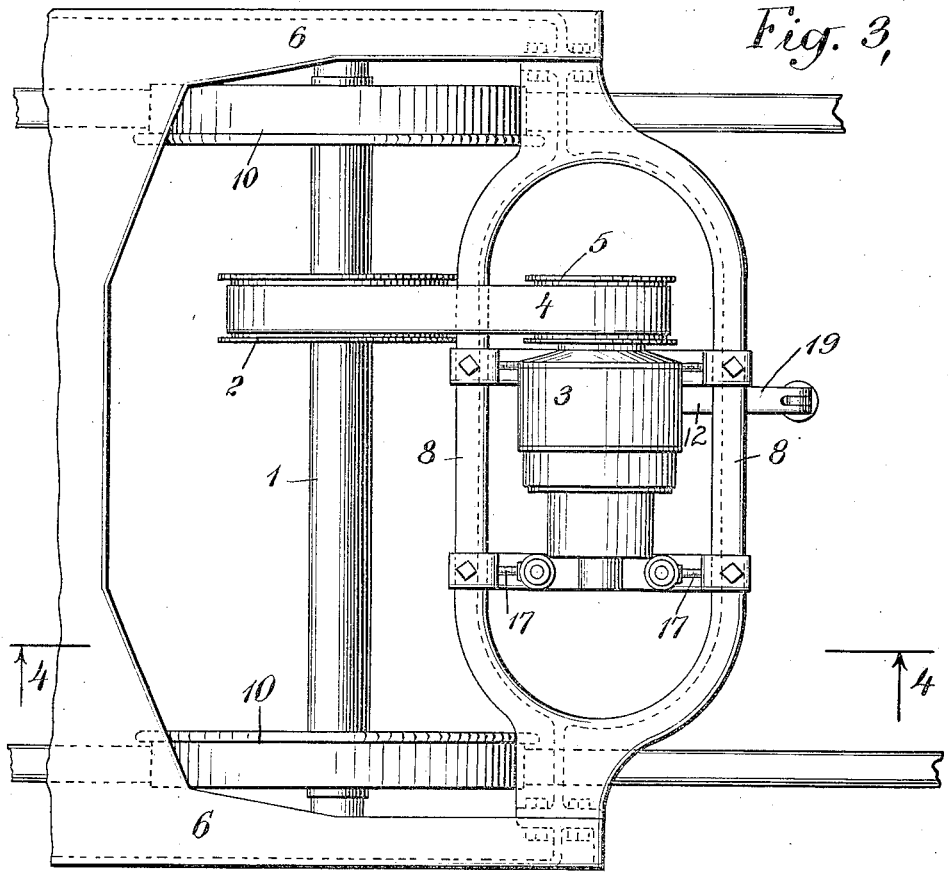
Figure 4:
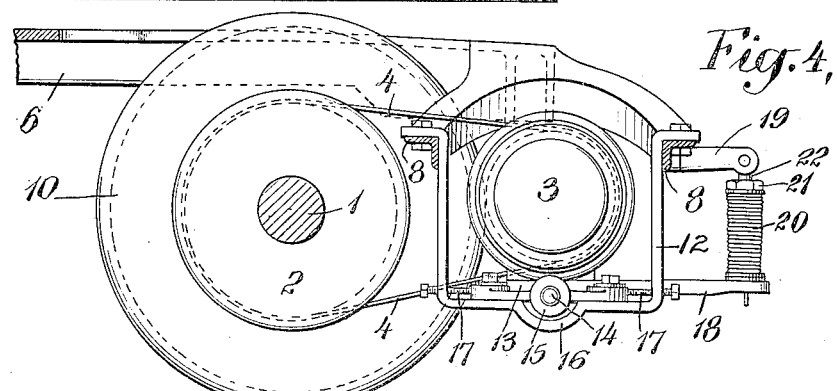

Figure 1 is a plan view of an integral form of truck frame showing a dynamo suspended therein; Fig. 2 is a side elevation on section line 2—2 of Fig. 1; Fig. 3 is a built up form of truck frame with a modified form of the divided end-sill, together with a dynamo suspended therein; and Fig. 4 is a side elevation on section line 4—4 of Fig. 3.

The car axle 1 is journaled in the truck in any well known way (not shown) and carries a pulley 2 adapted by means of a belt 4 and pulley 5, to drive, or to be driven by a dynamo electric machine (generator or motor) 3, depending upon whether a car lighting generator is driven from the axle to supply electric current or whether an electric motor is supplied with current to drive the car. Excepting the end-sills, the truck may be of any ordinary construction, having the side-sills 6. The end-sill comprises the two connecting members 7 projecting from the side-sills and an intermediate part divided horizontally into two transverse side members 8, thereby forming a space between the members adapted to embrace a dynamo. In this way the dynamo may be supported so that its center line lies substantially in line with the members 7, which is the position ordinarily occupied by the end-sills of the types of construction heretofore customary. In this way, the center line of the dynamo may be elevated so as to secure ample clearance between the bottom of the equipment and the top of the track rails.

In Fig. 1, I show an end-sill integral with the side-sills of the truck and with the ends merging thereinto in a curved outline, in order to obtain strength with an economical use of material. In Fig. 3, I show a bolted connection between the side sills and the end-sill. In Fig. 1, I show members of channel section, and in Fig. 3 members of angle section, although in either case any other suitable shape may be used for the purpose. The truck frame may be of cast steel or pressed steel, or any other suitable material, or the truck frame may be made entirely of, or comprise, wooden members mortised or otherwise suitably fastened together. Fig. 1 also shows a truck having longitudinal safety beams 9 inside of the wheels 10, the extension of these members forming the end members 11 of the end-sills. In the construction of Fig. 3, the longitudinal members 9 are omitted.

The side member 8 of the end-sill may be bolted or otherwise fastened to the end members 11, or may be made integral therewith as shown in the drawings. Also, the side members may be formed square with the end members as shown in Fig. 1, or they may merge thereinto to form curved ends as shown in Fig. 3. Various other modifications of the form of the end-sill and the connection with the side-sills are obviously within the scope of my invention, the only essential condition being that the end-sill be horizontally divided so as to be adapted to embrace a dynamo between the members thereof.

The suspension for the dynamo may have any suitable form and may be supported from the members 8 or 11 of the end-sill, or in any other well known manner, the essential condition being that the dynamo be located as near the axle as the driving connection will allow, so as not to set up exaggerate nosing or other troublesome action of the truck, and that the dynamo may partake of substantially all the swinging and tipping movements of the truck, so as to maintain a satisfactory driving connection between the dynamo and the axle at all times. Furthermore, the dynamo may be hung from above or supported from the side or from beneath, although, it is desirable to provide members underneath the dynamo to prevent it from falling onto the roadbed in case any part of the equipment should break.

In the drawings I show a construction in which the straps 12 are bent to form a cradle support for the dynamo, or to be hung or fastened in any suitable way from the side members 8 of the end-sill. The cradle straps directly support bed-plates 13 to which the dynamo is pivoted by fastening it to the rod 14 and then journaling the rod in bearings 15 in the bed-plates, or in any other suitable way. The straps are bent out at 16 to freely accommodate the bearings 15 and to allow them to be moved toward or away from the axle 1. The straps 12 are also provided with threaded holes through which pass the bolts 17. By these means the bed-plate may be adjusted by the bolts 17 in order to bring the dynamo shaft parallel to the axle 1, and also to adjust the interaxial distance between them, thereby providing means for tightening or loosening the belt at will. Any suitable automatic belt-tensioning device may be employed. I have illustrated a preferred form in which the lever 18 is fastened to the dynamo in any suitable way, and there is interposed between the end of the lever and a member 19 fastened to the frame of the truck, a spring 20 whereby the dynamo is turned about its pivot to automatically regulate the belt tension. The compressive stress of spring 20 is made adjustable by means of the nut 21 which may be screwed on the rod 22 to any position.

For the ordinary wooden trucks, I prefer to substitute for the end-sill now in use, an end-sill of cast steel or other suitable material with recesses for mortising in the wooden members of the truck, which otherwise will have the form shown in Fig. 1. For present trucks without end-sills, I propose to use an end-sill made up of angle iron or other suitable construction somewhat as shown in Fig. 3, except that the end-sill should preferably be made of two bent shapes instead of a single piece as shown. For present trucks without safety beams, I propose to use a construction similar to that of Fig. 3.

So far as I am aware, the end-sill herein shown with horizontally divided sides is broadly new, for the purposes described, and therefore my claims in connection therewith should be broadly interpreted.

This application broadly covers a truck having a divided part adapted to embrace a dynamo, and specifically a structure in which the end-sill is fastened to the side-sills, while the claims for the dynamo suspension broadly cover a dynamo mounted between the members of the end-sill, and specifically a cradle hung between the sides of the end-sill. In a companion application, Serial No. 627,773, filed May 17, 1911, the claims for the truck are limited to a structure in which the end-sill is integral with the side-sills, while the claims for the dynamo suspension are limited to trunnion bearings therefor, or a suspension supported between the end members of the truck.

Having thus described my invention what I claim is:

1. In a car truck, an end-sill having a horizontally divided part adapted to embrace a dynamo between the members thereof.

2. A car truck having side-sills and an end-sill having end pieces projecting from said side-sills and an intermediate divided part adapted to embrace a dynamo between the members thereof.

3. A car truck having side-sills and an end-sill fastened to said side-sills and having an intermediate divided part adapted to embrace a dynamo between the members thereof.

4. The combination with a truck having a divided end-sill, of a suspension adapted to support a dynamo between the members of said divided end-sill.

5. The combination with a truck having a divided end-sill, of a dynamo cradle fastened to the divided sides of the end-sill and adapted to support a dynamo.

6. The combination with a truck having an axle and a divided end-sill, of a dynamo suspended between the members of the end-sill and operatively connected with the axle by a belt, and means for adjusting the position of the dynamo with respect to the axle, whereby the tension of the belt may be adjusted.

7. The combination with a truck having an axle and a divided end-sill, of a dynamo pivotally connected between the members of the end-sill and operatively connected with the axle by a belt, and automatic means adapted to swing the dynamo about said pivot, whereby the tension of the belt is automatically regulated.

8. The combination with a truck having an axle and a divided end-sill, of a suspension between the members of the end-sill, a bed-plate slidably connected to the suspension, a dynamo supported from the bed-plate, and means for adjusting the position of the bed-plate with respect to the axle, whereby the belt may be tightened or loosened.

9. The combination with an axle and a truck having a divided end-sill, of a cradle suspended between the sides of the end-sill, a dynamo supported by the cradle and operatively connected with the axle by a belt, means for adjusting at will the position of the dynamo with respect to the axle, and means for automatically regulating the tension of the belt.

In testimony whereof I affix my signature, in presence of two witnesses.

PATRICK KENNEDY.

Witnesses:
Aug. Treadwell, Jr.,
Mrs. Edwin French.

---

Copies of this patent may be obtained for five cents each, by addressing the "Commissioner of Patents, Washington, D. C."